Aug. 22, 1961     D. F. BECKER ET AL     2,997,653
SINGLE STATOR WATTHOUR METER FOR POLYPHASE SYSTEMS
Filed Feb. 13, 1958     5 Sheets-Sheet 1
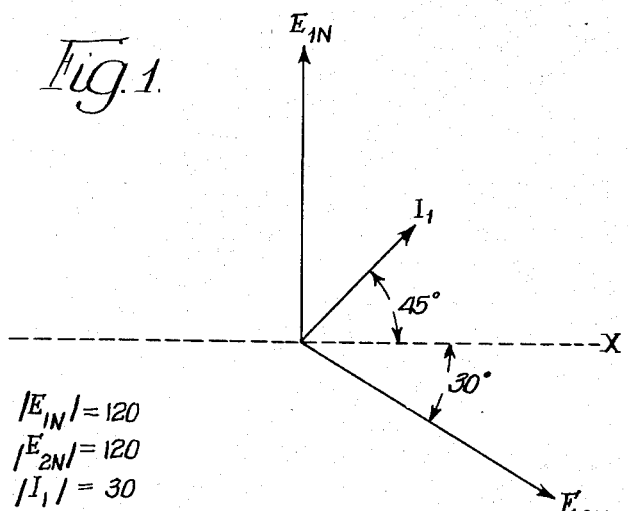
$|E_{1N}| = 120$
$|E_{2N}| = 120$
$|I_1| = 30$
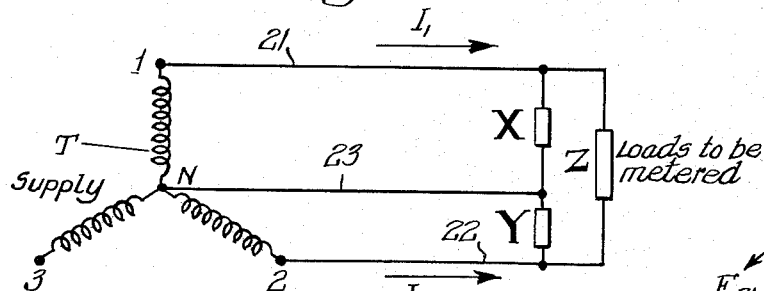
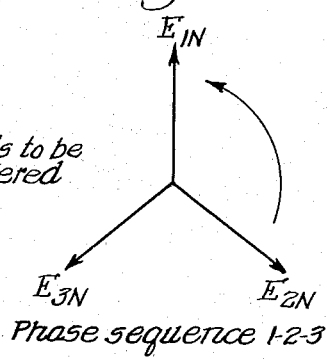
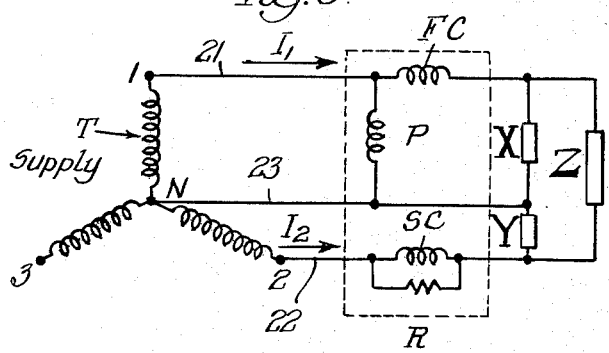
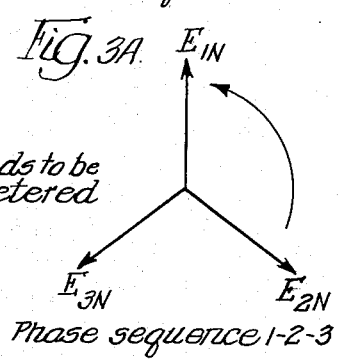
Inventors:
Dale F. Becker,
Fred Kurz,
By Brown, Jackson, Boettcher & Diemer
Attys.

$I_2 = I_R + I_C$
$I_C$ lags $I_2$ by $60°$

Phase sequence 1-2-3

Phase sequence 2-1-3

Unity Power Factor Load across $E_{12}$

30° Lagging Power Factor Load Across $E_{12}$

Inventors
Dale F. Becker,
Fred Kurz,
By Brown, Jackson, Boettcher & Dienner
Attys Aug. 22, 1961
D. F. BECKER ET AL
2,997,653
SINGLE STATOR WATTHOUR METER FOR POLYPHASE SYSTEMS
Filed Feb. 13, 1958
5 Sheets-Sheet 3
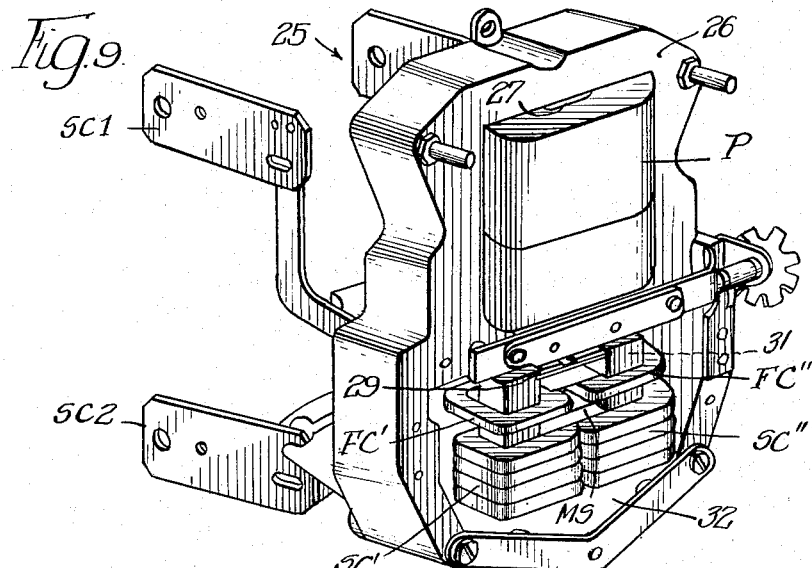
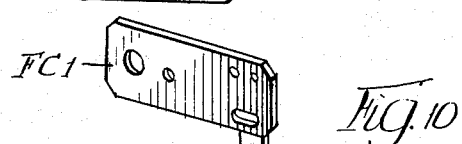
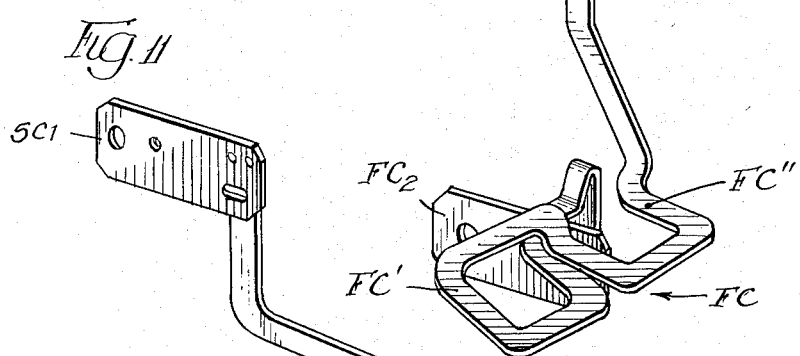
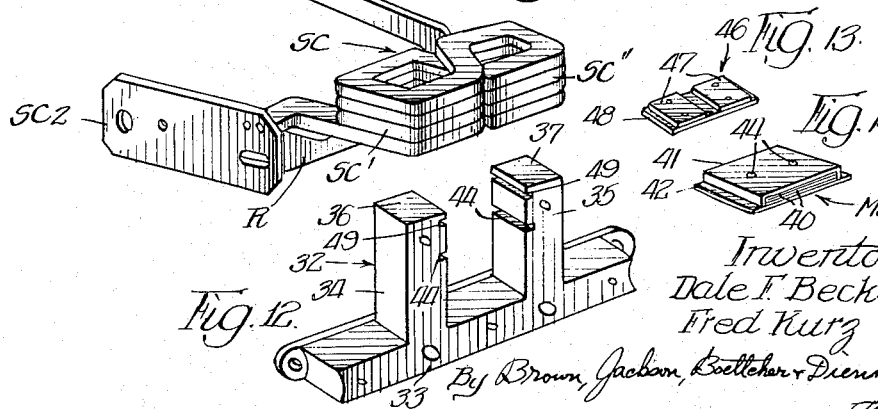
Inventors:
Dale F. Becker,
Fred Kurz
By Brown, Jackson, Boettcher & Dienner
Attys.

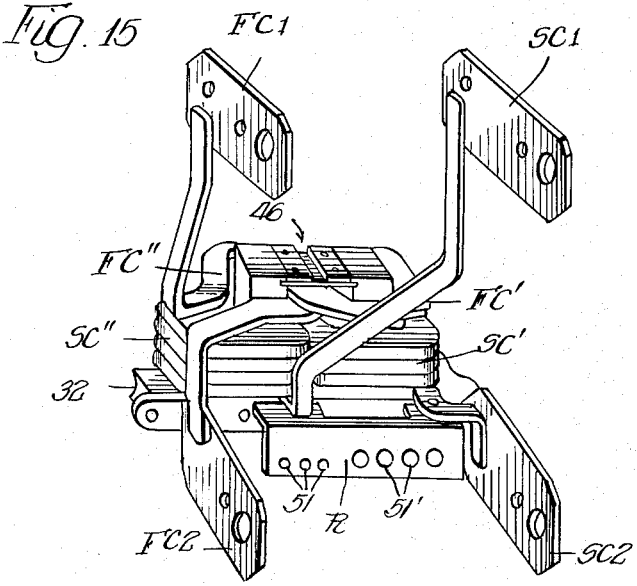
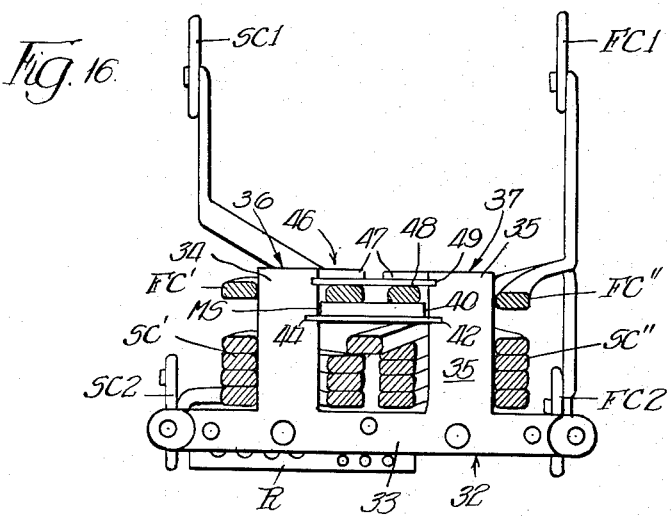

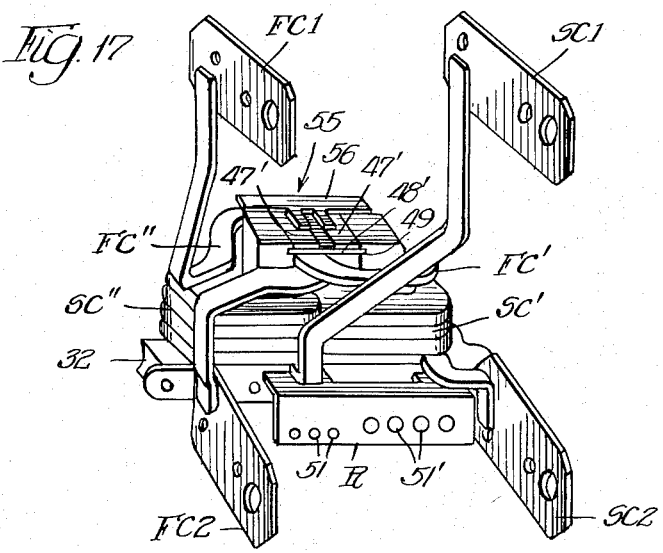
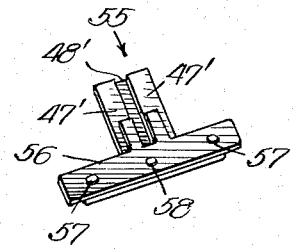

United States Patent Office 2,997,653
Patented Aug. 22, 1961

2,997,653
SINGLE STATOR WATTHOUR METER FOR POLY-
PHASE SYSTEMS
Dale F. Becker and Fred Kurz, Springfield, Ill., assignors,
by mesne assignments, to Sangamo Electric Company,
Springfield, Ill., a corporation of Delaware
Filed Feb. 13, 1958, Ser. No. 715,139
7 Claims. (Cl. 324—107)

This invention relates generally to a single stator watthour meter for metering polyphase electrical distribution systems, and in its more specific concept it relates to a single stator, single rotor watthour meter for metering two phases of a 4-wire, Y-connected, 3-phase distribution system.

The extensive use of 240 volt energized electric ranges, water heaters, clothes dryers, and other major appliances, has compelled the public utility companies to supply an increasing percentage of dwellings, buildings and areas with 240 volt service, in addition to the conventional 120 volt service ordinarily supplied for lighting and for energizing small appliances. In the past this requirement of two voltages has often been met by the use of 3-wire, singlephase, service with 120 volts between a neutral wire and each of two other wires and with 240 volts between the two other wires.

The rapidly expanding use during the present day of air conditioners and other large motor loads where polyphase service has many advantages, particularly in the starting characteristics of motors, has led to the increasing use of two phase lines and the neutral line of a 4-wire, Y-connected, 3-phase distribution network. Connection of a load between two phase lines of the Y-connected supply transformers will provide 208 volts service which approaches the 240 volt service in effectiveness for large heating loads. Connection of a load between either phase line and the neutral line will provide 120 volt service. Connection of all three lines provides a polyphase service with its advantages for motor operation. This additional advantage of the 3-wire, polyphase system over the 3-wire, singlephase system requires no more service wires, but has previously required the use of a multi-stator, single-rotor or a multi-stator, multi-rotor type of polyphase watthour meter. Such meters are substantially more expensive than the more conventional single-stator, single-rotor, single phase meters. In view of the increasing utilization of this combined 120/208 volt service, the need of a more simple and inexpensive meter for metering such service has been definitely recognized.

It is the primary object of the present invention to provide a more simple and inexpensive watthour meter for metering the power supplied over two phases of an electrical distribution system. It is another, more specific object of the invention to provide such a watthour meter which utilizes a single-stator, single-rotor construction.

It is still another object of the invention to provide such a watthour meter which incorporates only one phase-shifting arrangement having a minimum number of components.

Other objects, features and advantages of the invention will be apparent from the following detailed description of one preferred embodiment thereof.

In the accompanying drawings illustrating such embodiment:

FIGURE 1 is a vector diagram utilized in the explanation of the invention.

FIGURE 2 is a circuit diagram of the supply transformer end of the 3-wire, 2-phase supply circuit to be metered by the present meter.

FIGURE 2A is a vector diagram of the phase sequences present in FIGURE 2.

FIGURE 3 is a circuit diagram showing the improved meter connected in the 3-wire, 2-phase network of FIGURE 2.

FIGURE 3A is a vector diagram showing the phase sequences present in FIGURE 3.

FIGURE 9 is a perspective view of the single-stator structure of the meter.

FIGURE 10 is a perspective view of the first or conventional current coil of this single-stator structure.

FIGURE 11 is a perspective view of the special or second current coil of this single-stator structure.

FIGURE 12 is a perspective view of the current coil core structure of this single-stator.

FIGURE 13 is a perspective view of the pole face extension plate assembly to be located between the pole faces at the upper end of the core structure of FIGURE 12.

FIGURE 14 is a perspective view of the magnetic leakage core which is to be disposed in shunting relation between the legs of the current core structure above the special or second current coil.

FIGURE 15 is a perspective view of the current coils and core structure with magnetic leakage core and pole face extension plate assembly.

FIGURE 16 is a sectional view of the current coils and core structure with magnetic leakage core and pole face extension plate assembly.

FIGURE 17 is a perspective view of an alternate construction of the current coils and core structure with magnetic leakage core and a pole face extension plate assembly combined with an overload bridge.

FIGURE 18 is a perspective view of a pole face extension plate assembly combined with an overload bridge.

Figure 4:
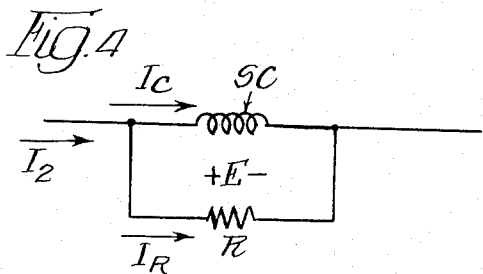
FIGURE 4 is an enlarged fragmentary circuit diagram showing the electrical resistive shunt connected across the special or secondary current coil on the single stator of the meter.
Figure 4A:
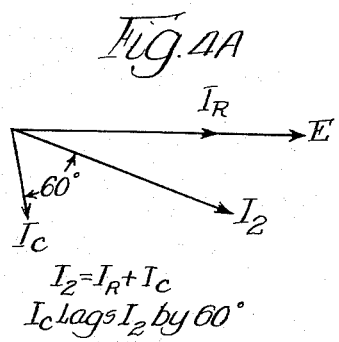
FIGURE 4A is a vector diagram associated with FIGURE 4.

The theory of the invention will first be described in connection with FIGURES 1 to 8 inclusive, following which the pertinent structure of one preferred embodiment of the improved meter will be described in connection with FIGURES 9 to 18 inclusive. To explain the theory of this single-stator network meter, it is desirable to first define the network that is to be metered, and also to define the symbolism used in the following description. Symbols such as $E_{1N}$, $E_{2N}$, $I_1$, etc. represent vector voltages and currents. Consequently, these symbols imply both magnitude and phase angle information. Symbols such as $/E_{1N}/$, $/E_{2N}/$, $/I_1/$, etc. represent the magnitudes only (voltmeter and ammeter readings) of the vector voltages and currents $E_{1N}$, $E_{2N}$, $I_1$, etc.

Referring to FIGURE 1, $E_{1N}$ is the vector having the magnitude $/E_{1N}/=120$ at a phase angle of 90° leading when referred to the positive X axis. In addition, $E_{2N}$ is the vector having the magnitude $/E_{2N}/=120$ at a phase angle of 30° lagging when referred to the positive X axis. Finally, $I_1$ is the vector having the magnitude $/I_1/=30$ at a phase angle of 45° lagging when referred to $E_{1N}$.

The network under consideration is shown in FIGURE 2 and comprises two phases of a 4-wire, Y-connected, 3-phase power transformer and distribution system. The power transformer T comprises the three secondary windings or legs 1, 2 and 3 which are all Y-connected at the neutral N. The 3-wire distribution circuit comprises conductor 21 leading from secondary winding 1, conductor 22 leading from secondary winding 2, and conductor 23 leading from neutral point N. In this system the voltages are 120° apart, and as will be discussed, these voltages must be balanced and properly identified as to phase sequence. FIGURE 2A shows the phase sequence 1–2–3 for the network under discussion.

FIGURE 3 illustrates diagrammatically the circuit of the present improved single-stator watthour meter which will meter the network described above. In this meter the phase voltage $E_{1N}$ is applied to the potential coil P. The line current $I_1$ passes through the first current coil FC. Part of the other line current $I_2$ passes through a second current coil SC which is so constructed that the current through this second coil lags the line current $I_2$ by an angle to give the correct registration of the meter as explained herein. This is in the order of 60°. The lagging of this current is accomplished by the proper choice of resistance to inductance of the current coil SC itself. In addition, a resistive shunt R is used across this current coil SC to complete the phase shifting network. As will be shown later, such a meter, consisting of a single potential and current electromagnetic structure, in combination with one potential coil P, two current coils FC and SC and one shunt R, can measure the energy of the 3-wire network system, described above. FIGURE 3A shows the phase sequence 1–2–3 of FIGURE 3. FIGURES 2 and 3 illustrate a typical relation of electrically energized loads to be metered by our improved construction of meter; wherein load X is a 120 volt load connected between the first phase conductor 21 and neutral conductor 23; wherein load Y is another 120 volt load connected between the second phase conductor 22 and the neutral conductor 23; and wherein load Z is a 208 volt load connected across the first and second phase conductors 21 and 22.

Referring to FIGURE 4 which shows the relation of the resistive shunt R connected across the special or shunted current coil SC, the voltage E is the voltage across the current coil SC and its shunt R. The line current $I_2$ is the sum of $I_C$ and $I_R$. The current coil SC must be highly inductive in order that its current lags the current $I_2$ by a proper angle. A magnetic shunt MS, spaced from the main magnetic circuit, as will be presently described, insures the proper value of inductance for the current coil SC. The current $I_R$ is, of course, in phase with E. By the proper choice of R and the resistance and inductance of the current coil SC, $I_C$ will lag $I_2$ by the desired angle and after this choice, the ratio of $/I_C/$ to $/I_2/$ will be a constant.

Figure 5:
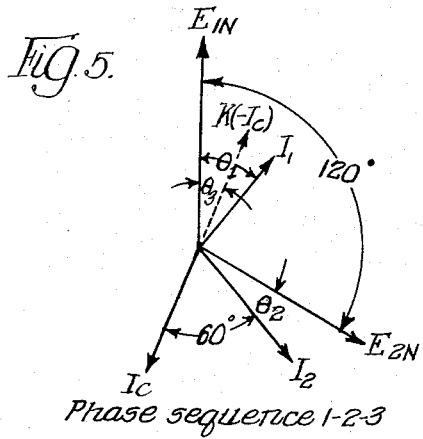
FIGURE 5 is a vector diagram of phase sequences 1-2-3.

The following mathematical proof is submitted to show that the meter will measure properly, as corroborated by actual reductions to practice tested under widely different load conditions. Referring to FIGURE 5, let it be assumed that the phase angle between $E_{1N}$ and $I_1$ is $\Theta_1$, and that the phase angle between $E_{2N}$ and $I_2$ is $\Theta_2$. The power to the load is then $$P = /E_{1N}/ \ /I_1/ \cos \Theta_1 + /E_{2N}/ \ /I_2/ \cos \Theta_2$$

With the phase sequence 1–2–3, $E_{2N}$ lags $E_{1N}$ by 120° and $I_2$ lags $E_{2N}$ by $\Theta_2$. Then $I_2$ will lag $E_{1N}$ by $\Theta_2+120°$. By proper adjustment of the resistive shunt R and the magnetic circuit of the meter, $I_C$ can be made to lag $I_2$ by an angle which, as far as its effect upon the registration of the meter is concerned, would be 60°. Then since $I_2$ lags $E_{1N}$ by $\Theta_2+120°$, $I_C$ will lag $E_{1N}$ by $\Theta_2+120°+60°=\Theta_2+180°$. By proper meter connections, $I_C$ is reversed in the meter and the angle by which $-I_C$ lags $E_{1N}$ is $\Theta_3=\Theta_2+180°-180°$, and as far as the registration of the meter is concerned, $$\Theta_3 = \Theta_2$$

The coil SC and the shunt R comprise a closed loop and act as shorted turns about the legs of the current core structure to cause the total magnetic flux resulting from $I_1$ to lag $I_1$ by some appreciable angle. In order to compensate for this phase shift in the flux due to $I_1$, the flux due to the voltage $E_{1N}$ is shifted a corresponding amount by means of the usual meter power factor adjustment of shorted turns or a lag plate about the tip of the potential electromagnet. Therefore the angle by which $I_C$ is made to lag $I_2$ may not be exactly 60° and the angle $\Theta_3$ by which $-I_C$ lags $E_{1N}$ may not be exactly equal to $\Theta_2$, but the flux in the gap of the meter due to $-I_C$ would be made to have the proper relationship to the flux in the meter gap due to $E_{1N}$ so that the registration of the meter would be the same as though $-I_C$ lagged $E_{1N}$ by $\Theta_2$.

The currents $/I_C/$ and $/I_2/$ are not equal, but do bear a constant ratio to each other which we represent as K, a scalar quantity. By proper design of magnetic circuit and choice of the number of turns for coil SC, then, $$K \ /-I_C/ = /I_2/$$

Since a balanced system of voltages is assumed, $$/E_{1N}/ = /E_{2N}/$$

The meter will register $/E_{1N}/ \ /I_1/ \cos \Theta_1$ in the conventional manner and $/E_{1N}/ \ K \ /-I_C/ \cos \Theta_3$ the same as though it were equal to the power represented by $/E_{2N}/ \ /I_2/ \cos \Theta_2$. Thus the total power registered by the meter will be:

$$/E_{1N}/ \ /I_1/ \cos \Theta_1 + /E_{2N}/ \ /I_2/ \cos \Theta_2$$

which is P, the power to the load.

Figure 6:
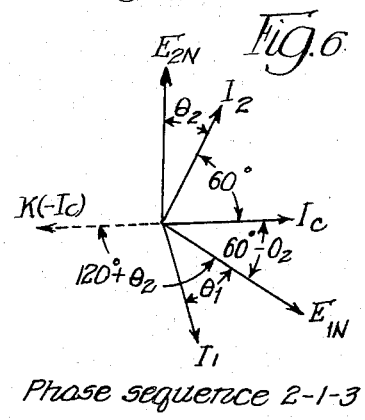
FIGURE 6 is a vector diagram of phase sequences 2-1-3.

It was mentioned that meter connections must be made for proper phase sequence. To illustrate the importance of this, assume as shown in FIGURE 6, that $E_{2N}$ leads $E_{1N}$ by 120°. It then follows that if $I_C$ lags $I_2$ by 60°, that $-I_C$ ($I_C$ connected in reverse) will then lag $E_{1N}$ by 120°+$\Theta_2$ instead of by $\Theta_2$ as is required for correct registration by the meter.

It is to be noted that although FIGURES 5 and 6 show $I_2$ lagging $E_{2N}$, that the same conclusions are to be reached with $I_2$ leading $E_{2N}$ or $I_2$ in phase with $E_{2N}$; that is, the meter will register correctly if connected for proper phase rotation, but not otherwise. In the derivation and proof above the values of $\Theta_2$ were considered positive (+) when $I_2$ lagged $E_{2N}$, and should therefore be considered negative (−) in cases where the current $I_2$ leads $E_{2N}$.

Figure 7:
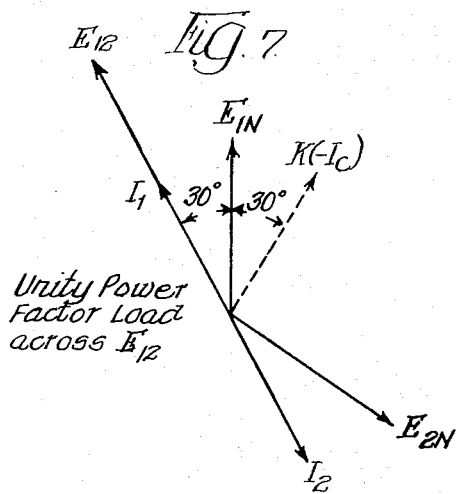
FIGURES 7 and 8 illustrate vector diagrams of a unity power factor and a lagging power factor load across the line voltage.
Figure 8:
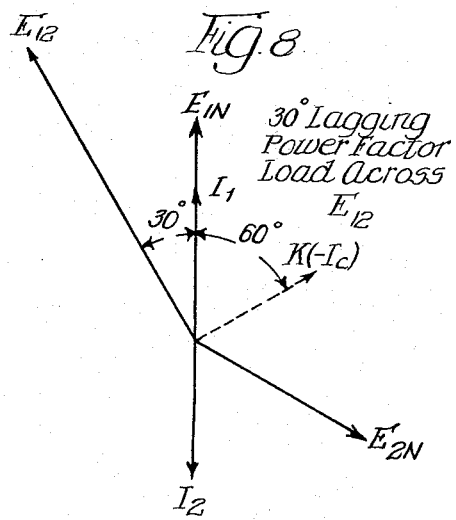

FIGURE 7 illustrates a vector diagram of unity power factor load across the line voltage, $E_{12}$. FIGURE 8 illustrates a vector diagram with a lagging power factor load across the line voltage, $E_{12}$. It is readily apparent that these currents in line 1 and line 2 will add vectorially to the currents in lines 1 and 2 due to loads across the voltages $E_{1N}$ and $E_{2N}$ and be properly registered by the meter.

It will be seen that the foregoing discloses a single-stator meter, which by the addition of a single shunt resistance R and magnetic shunt MS can be used to meter a 3-wire network load as part of a 4-wire, Y-connected 3-phase system. It is desirable or necessary that this meter operate on a balanced voltage system with proper connection for the phase sequence. Also, this same basic idea can be used to measure a 3-wire, 3-phase system. The only change would be that the winding direction of the shunted coil SC would be reversed by interchanging the two external connections. Proper phase sequence and balanced voltage are also required, as in the preceding description.

FIGURES 9 to 16 inclusive illustrate a physical embodiment of the improved meter, it being understood that this is merely a preferred or exemplary form, and that numerous modifications and rearrangements may be made therein without departing from the essence of the invention. The single-stator structure 25 comprises an inverted U-shaped laminated core 26 having a downwardly extending central leg 27 on which is mounted the potential coil P. The lower end of this downwardly extending central leg 27 terminates at the gap 29 in which rotates the single meter disk 31. The side arms of the laminated core 26 extend down below the gap 29 and disk 31 and support therebetween the laminated core structure 32 on which are mounted the two current coils FC and SC. This latter core structure comprises a horizontal bridging portion 33 from the upper side of which project two upwardly extending core legs 34 and 35. These core legs terminate at their upper ends in pole pieces 36 and 37 which lie just below the meter disk 31.

The first current coil FC is mounted on the upwardly extending core legs 34 and 35 preferably near the upper ends thereof. This first coil comprises one or more turns FC' encircling core leg 34, and one or more turns FC'' encircling core leg 35, these turns generally being of flat ribbon form edge wound lying horizontally. The winding direction of these two sets of turns is reversed, as is customary, so that energization in one direction of current flow will cause downward flux flow in one core leg and upward flux flow in the other core leg, and vice versa. In watthour meters of relatively high rating, there may be only a single turn FC' and a single turn FC''. The ends of this first coil FC have attachment to connection terminals or socket bayonets FC1 and FC2 which are mounted on the meter base for connection with line 21.

The shunted or special current coil SC is also mounted on the core legs 34 and 35, preferably below the first current coil FC. This second coil comprises a plurality of turns SC' encircling core leg 34 and a plurality of turns SC'' encircling core leg 35, these turns preferably being of flat ribbon form edge wound lying horizontally, as shown in FIGURE 11. The winding direction of these two sets of turns SC' and SC'' is also reversed with respect to the two core legs so that energization in one direction of current flow will cause downward flux flow in one core leg and upward flux flow in the other core leg, and vice versa. In meters of relatively high ratings, there may be approximately four turns SC' and four turns SC''. The ends of this shunted coil SC have attachment to connection terminals or socket bayonets SC1 and SC2 which are mounted on the meter base for connection with line 22. The resistive shunt R is bolted and soldered, or riveted, or brazed to the ends of the coil SC or to its connection terminals SC1 and SC2.

Referring now to the magnetic shunt or magnetic leakage core MS, this is located in magnetic shunting relation between the upwardly extending core legs 34 and 35, preferably at a point above the shunted current coil SC. This magnetic shunt MS serves to increase the inductance of this shunted current coil SC. As previously described, the current coil SC must be highly inductive in order that its energizing current $I_C$ shall lag the phase line current $I_2$ by a proper angle. Such magnetic shunt preferably comprises a plurality of magnetic laminations 40, which are spaced from physical contact with the two core legs 34 and 35 by non-magnetic spacers 41 which are suitably dimensioned to prevent saturation of the magnetic shunt MS over the working range of the meter. For convenience of manufacture the non-magnetic spacers 41 may be made of one single piece of non-magnetic material if properly formed about the magnetic shunt. A locating plate 42 made of non-magnetic material such as brass, is attached to the magnetic laminations and spacers by means of two rivets 43. This locating plate has projecting ends which are adapted to be received in slots or notches 44 formed in the opposing faces of the two core legs 34 and 35, this locating plate thereby serving to locate the magnetic shunt or leakage core MS between the core legs 34 and 35 at the proper vertical distance.

The improved meter is also shown as being provided with a pole face fitting 46 comprising auxiliary pole faces 47 to increase the effective area of the pole faces 36 and 37. The auxiliary pole faces 47 are suitably attached to a carrying plate 48 which is made of non-magnetic material. This carrying plate also has projecting ends which are adapted to be received in slots or notches 49 formed in the opposing faces of the two core legs 34 and 35 so as to locate the upper surfaces of the auxiliary pole faces flush with pole faces 36 and 37, as well as in edge contact with the same.

The shunt R is made of either advance metal or manganin metal because of their resistivity and temperature characteristics. The shunt R is provided with a series of holes 51, 51' of varying size and distance from the edge. By the use of simple hand-operated cutters it is possible to cut the metal from the edge of the shunt to the hole and thus provide a change in the over-all resistance of the shunt as an adjustment.

It will also be understood that the meter is provided with permanent damping magnets and registering mechanism, which are not shown; and may be further provided with full load adjusting means, light load adjusting means, lag adjusting means, inductive load adjusting means, temperature compensating means, voltage variation compensating means, a phase sequence indicating device and the like, all of which are conventional in watthour meter practice.

As one typical set of values for a meter nominally rated at 15 amperes at 120 volts with a maximum current carrying capacity of 60 amperes in a successfully operating embodiment of the invention, the first current coil FC consisted of two turns as shown in FIGURE 10 and the second current coil SC consisted of eight turns as shown in FIGURE 11, the magnetic shunt MS consisted of seven laminations of .014 inch thick silicon steel and spacers 41 were of .005 inch thick non-magnetic stainless steel. The load characteristics of this meter were found to be such that special overload compensation was not necessary to produce the accuracy which is considered acceptable in the industry and a pole face extension plate assembly such as shown in FIGURE 13 gave satisfactory results.

In order to obtain acceptable accuracy of registration at an extended current range of 100 amperes, it was found desirable to provide overload compensating means 55 such as shown in FIGURES 17 and 18. This consists of a non-magnetic plate 48' for mounting in the slots 49, this plate carrying the two pole face extensions 47', together with an overload compensating plate 56 of magnetic material, these several parts all being suitably held together by rivets 57 or other means. In the center of the cross bar of the T-shaped compensating plate 56 is a hole 58 which may readily be changed in manufacture for adjusting the cross section traversed by the flux, to meet different manufacturing requirements.

While we have illustrated and described what we regard to be the preferred embodiments of the present invention, nevertheless it will be understood that such are merely exemplary and that numerous modifications and rearrangements may be made therein without departing from the scope of the invention.

We claim:

1. In an electric meter for metering the electrical energy transmitted over two phase conductors of a 4-conductor, Y-connected, 3-phase distribution system, having a neutral conductor, the combination of a single rotative meter disk, a single stator acting on said disk comprising a core structure, a potential coil on said core structure connected to respond to the potential between one of said two phase conductors and said neutral conductor, a first current coil on said core structure connected to respond to the current flow through one of said two phase conductors, a second current coil on said core structure connected to respond to the current flow through the other of said two phase conductors, a resistance element connected directly across said second current coil for producing a lagging current flow through said second current coil, and a magnetic shunt mounted adjacent said core structure for increasing the inductance of said second current coil, said magnetic shunt being non-saturating over the working range of the meter.

2. A meter for providing an indication of the power coupled from first and second phase conductors of a 4-conductor, Y-connected, 3-phase distribution system having a neutral conductor, said meter comprising a potential responsive element coupled between said first phase conductor and said neutral conductor, a first current responsive element connected in series with said first phase conductor, a second current responsive element having a high value of inductance and connected in series with said second phase conductor, a resistive element connected directly across said second current responsive element, a common current magnetic member for supporting said first and second current responsive elements, and means including a magnetic shunt associated with but separated from said common current magnetic member to aid in providing said high value of inductance in said second current responsive element, said magnetic shunt being non-saturating over the working range of the meter.

3. A meter for providing an indication of the power coupled from first and second phase conductors of a 4-conductor, Y-connected, 3-phase distribution system having a neutral conductor, said meter comprising a first current responsive element connected in series with said first phase conductor to provide a first metering current substantially in phase with the first phase current, a potential responsive element coupled between said first phase conductor and said neutral conductor, a second current responsive element having a high value of inductance and connected in series with said second phase conductor, a resistive element connected directly across said second current responsive element, and a magnetic shunt mounted adjacent said second current responsive element to increase the effective inductance of said element, said high value of inductance and said parallel coupled resistive element being effective to produce in said second current responsive element a second metering current which lags the second phase current by a fixed angle.

4. A meter according to claim 3 in which said fixed angle is substantially equal to 60°.

5. In an electric meter for metering the electrical energy transmitted over two phase lines and the neutral line of a 4-wire polyphase distribution system, the combination of a single rotative meter disk, a single stator acting on said disk, said single stator comprising a core structure having a potential responsive leg on one side of said meter disk and two substantially parallel current responsive legs on the other side of said meter disk, a potential coil on said potential responsive leg connected between one of said phase lines and said neutral line, a first current coil comprising turns mounted on the upper portions of said two current responsive core legs and connected in series with one of said phase lines, a second current coil comprising turns mounted on the bottom portions of said two current responsive core legs and connected in series with the other phase line, a resistive electrical shunt connected across said second current coil, and a magnetic shunt mounted in magnetic bridging relation between said two current responsive core legs substantially at a point between said first and second current coils, said magnetic shunt serving to increase the inductance of said resistive shunted second current coil and being non-saturating over the working range of the meter.

6. In an electric meter for metering the electrical energy transmitted over first and second phase conductors of a 4-conductor, Y-connected, 3-phase distribution system having a neutral conductor, the combination of a single rotative meter disk, a single stator acting on said disk comprising a core structure having two substantially parallel core legs, a potential coil on said core structure connected to be responsive to the potential between said first phase conductor and said neutral conductor, a first current coil wound on said two core legs and connected to be responsive to the current flow through said first phase conductor, a second current coil mounted on said two core legs and connected to be responsive to the current flow through said second phase conductor, an electrical shunt connected across said second current coil to lag the current passing through said coil, auxiliary pole faces at the ends of said core legs adjacent to said disk, and a magnetic shunt mounted in magnetic bridging relation between said two core legs substantially at a point between said first and second current coils, said magnetic shunt serving to increase the inductance of said second current coil and being non-saturating over the working range of the meter.

7. In an electric meter for metering the electrical energy transmitted over two phase wires and a neutral wire of a 4-wire, Y-connected, 3-phase distribution system, the combination of a single rotative meter disk, a single stator acting on said disk comprising a core structure having two substantially parallel core legs, a potential coil on said core structure connected to be responsive to the potential between one of said two phase wires and said neutral wire, a first current coil wound on said two core legs and connected to be responsive to the current flow through one of the said two phase wires, a second current coil mounted on said two core legs and connected to be responsive to the current flow through the other of said two phase wires, a resistive electrical shunt connected directly across said second current coil for producing a lagging current flow therethrough, a magnetic shunt positioned adjacent said two core legs and said second current coil to increase the effective inductance of said second current coil, and overload compensating means comprising a non-magnetic plate positioned on said two core legs adjacent to said disk.

References Cited in the file of this patent

UNITED STATES PATENTS

| | | |
|---|---|---|
| 1,722,157 | Pratt | July 23, 1929 |
| 1,996,936 | Spahn | Apr. 9, 1935 |
| 2,003,939 | Indergand | June 4, 1935 |
| 2,177,274 | Barnes | Oct. 24, 1939 |

FOREIGN PATENTS

| | | |
|---|---|---|
| 481,865 | Germany | Oct. 2, 1929 |